United States Patent [19]

Lenzen et al.

[11] Patent Number: 5,181,737
[45] Date of Patent: Jan. 26, 1993

[54] SAFETY APPARATUS FOR VEHICLE OCCUPANT

[75] Inventors: Reiner Lenzen, Almont; Ernst M. Faigle, Dryden; John H. Semchena, Royal Oak, all of Mich.

[73] Assignee: TRW Vehicle Safety Systems Inc., Lyndhurst, Ohio

[21] Appl. No.: 548,134

[22] Filed: Jul. 5, 1990

[51] Int. Cl.5 ............................................. B60R 21/22
[52] U.S. Cl. ................................. 280/732; 102/275.1
[58] Field of Search ............... 280/732, 743, 728, 730, 280/734, 735; 102/275.1, 275.8

[56] References Cited

U.S. PATENT DOCUMENTS

| 2,945,442 | 7/1960 | Adelman et al. | 102/378 |
|---|---|---|---|
| 3,590,739 | 7/1971 | Persson . | |
| 3,622,176 | 11/1971 | Byer . | |
| 3,632,136 | 1/1972 | Foltz | 280/732 |
| 3,643,971 | 1/1972 | Kushnick . | |
| 3,694,003 | 9/1972 | Radke . | |
| 3,944,250 | 3/1976 | Wulf et al. | 280/732 |
| 4,220,087 | 9/1980 | Posson . | |
| 4,773,673 | 9/1988 | Sakurai . | |
| 4,991,870 | 2/1991 | Beusterien | 280/743 |

FOREIGN PATENT DOCUMENTS 3545028  7/1987  Fed. Rep. of Germany ...... 280/743

Primary Examiner—Karin L. Tyson
Attorney, Agent, or Firm—Tarolli, Sundheim & Covell

[57] ABSTRACT

A safety apparatus for a vehicle occupant comprises an airbag which inflates outwardly from a housing into a vehicle occupant compartment. An ignitable material for facilitating outward movement of the inflating airbag past a closure panel is supported by the closure panel between the airbag and the occupant compartment.

8 Claims, 4 Drawing Sheets

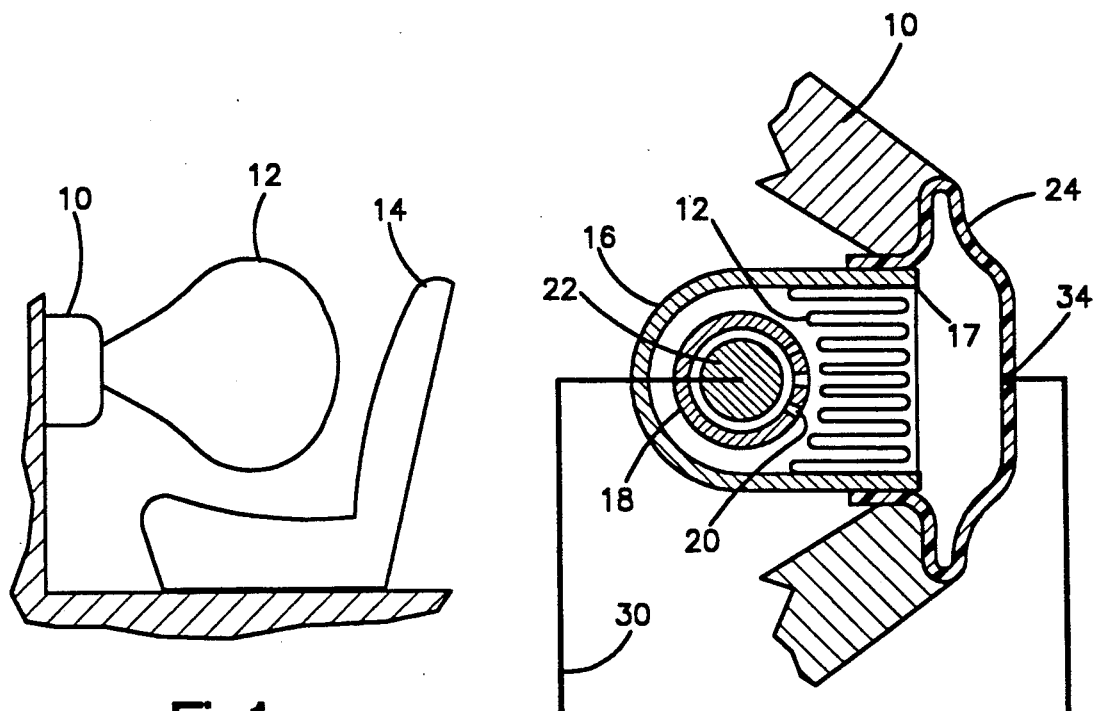
Fig.1
Fig.2
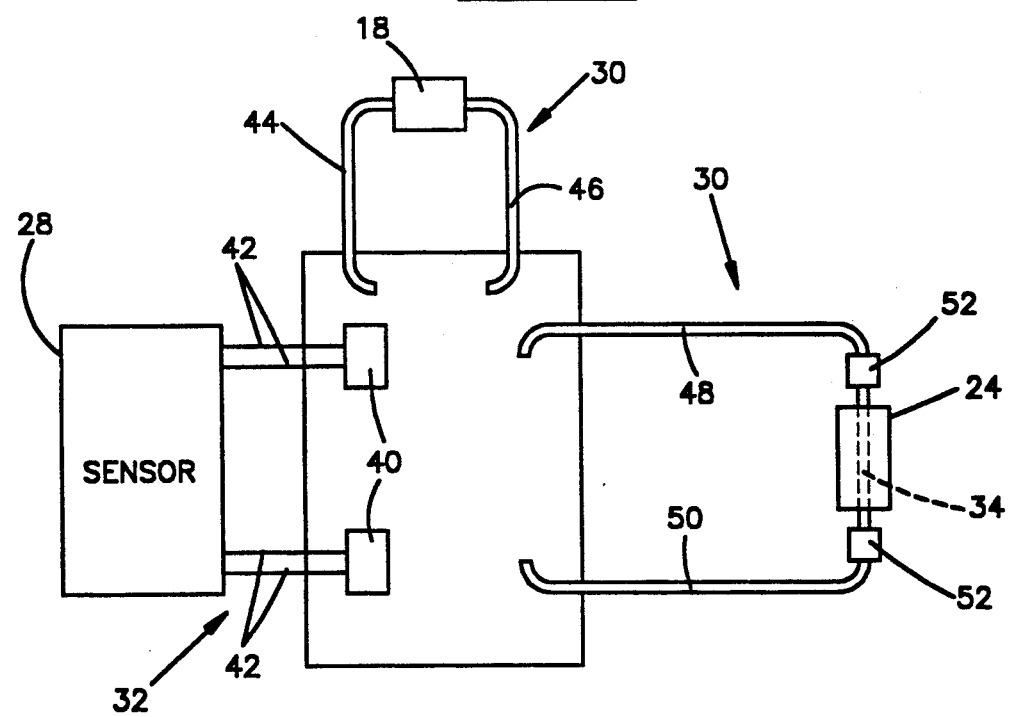
Fig.3

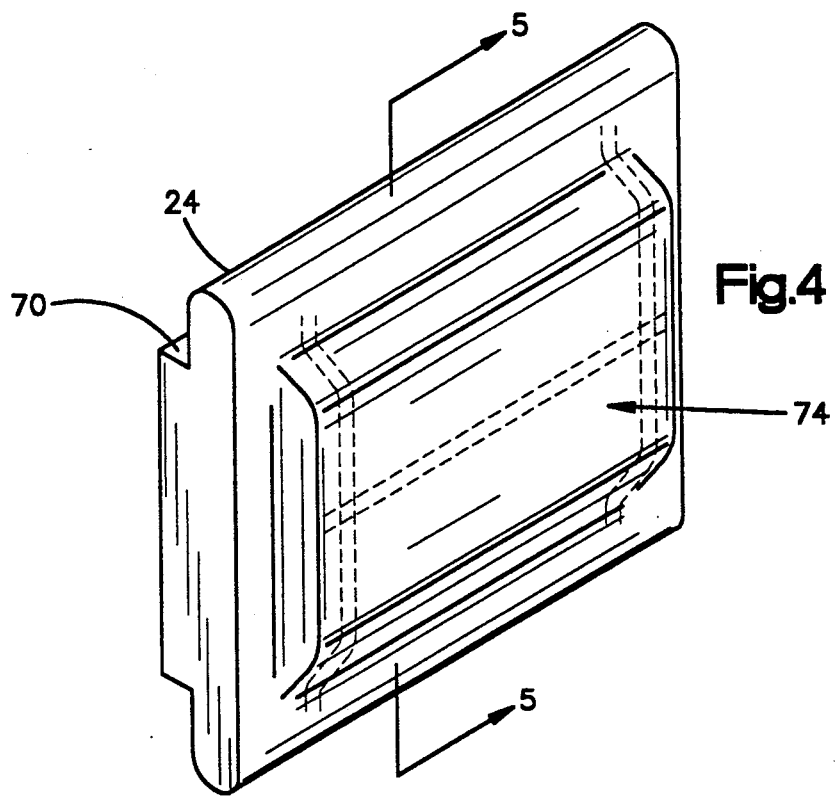
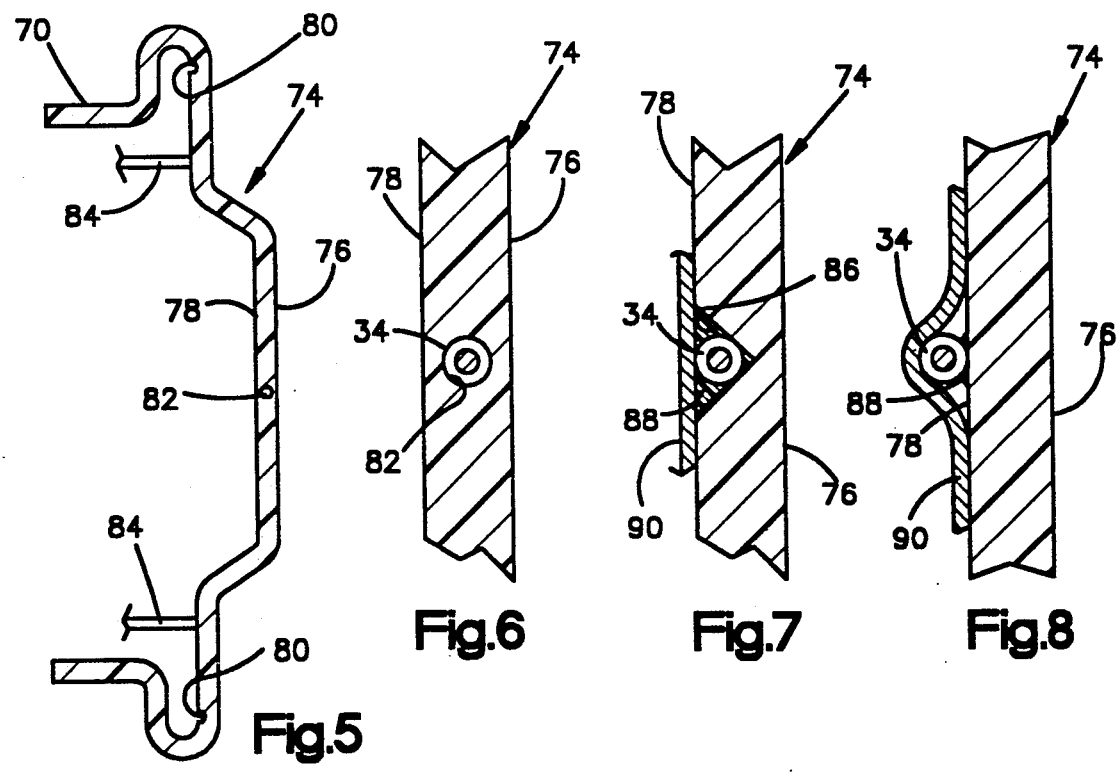

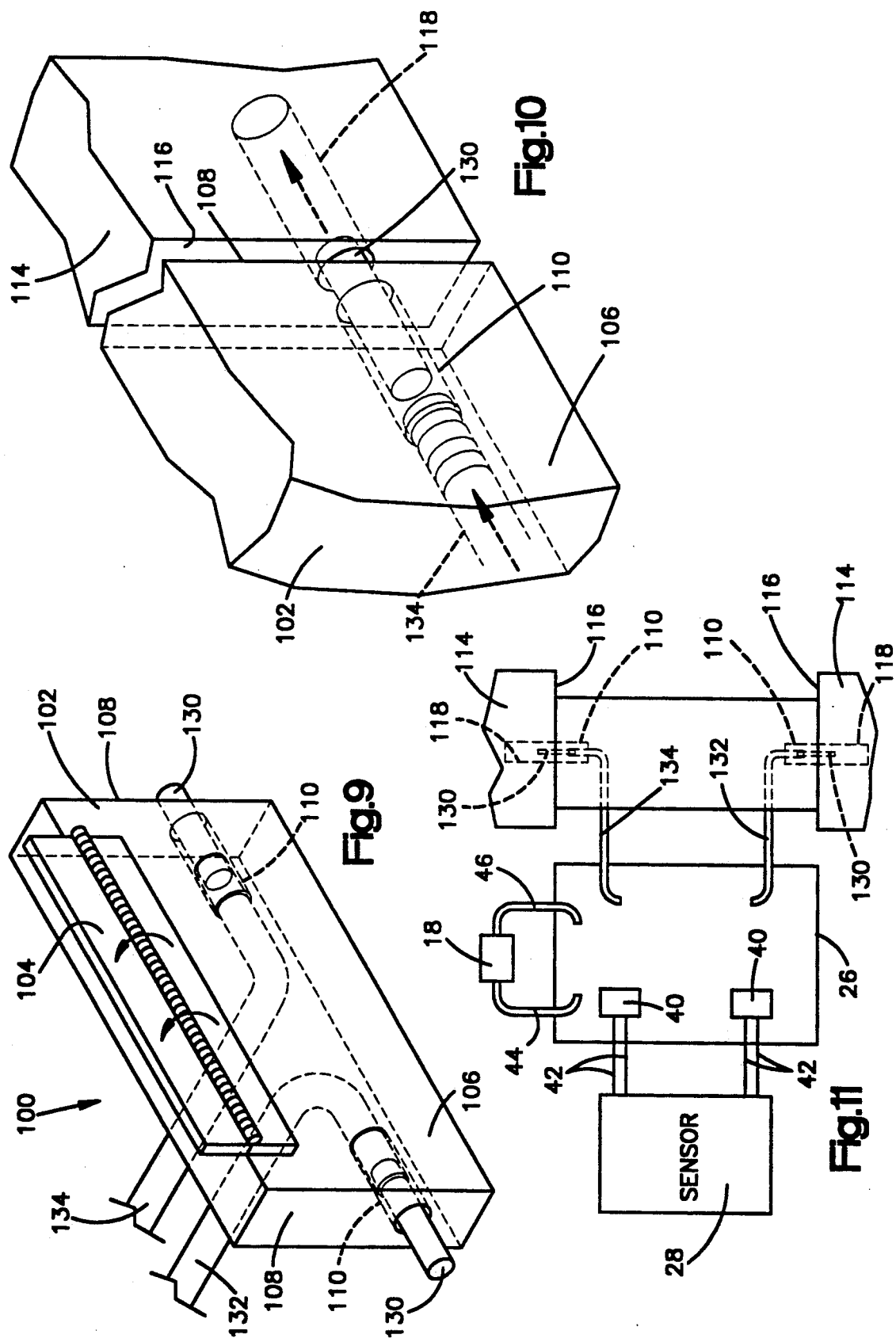

SAFETY APPARATUS FOR VEHICLE OCCUPANT

FIELD OF THE INVENTION

The present invention relates to a vehicle occupant safety apparatus, and particularly relates to a safety apparatus which includes an inflatable airbag.

BACKGROUND OF THE INVENTION

A known safety apparatus for the occupant of a vehicle includes an airbag, a housing for the airbag, a gas source, and a closure panel for the housing. The housing is received within the vehicle dashboard or the steering column, and the airbag is typically stored in a folded condition inside the housing. The closure panel conceals the other components from the occupant compartment of the vehicle.

when the vehicle experiences a crash, the gas source is activated. The gas is directed into the airbag to cause inflating movement of the airbag outwardly from the housing toward a position in which the inflated airbag restrains forward movement of an occupant of the vehicle. The inflating airbag moves past the closure panel in its movement from its stored position in the housing to its occupant restraining position in the occupant compartment.

U.S. Pat. No. 3,622,176 shows a vehicle occupant safety apparatus including a closure panel which is formed from a deformable plastic material. Grooves are formed in a surface of the closure panel to define weakened regions of the closure panel. As the airbag is inflated by gas emitted from the gas source, the outwardly moving airbag applies pressure against the inside surface of the closure panel. This pressure causes the closure panel to rupture along the grooves so that the panel splits apart to provide an opening through which the inflating airbag can move into the occupant compartment. The gas source must provide a gas pressure which is sufficient to inflate the airbag into an occupant restraining position and also to rupture the closure panel within the brief time allotted for inflation of the airbag.

SUMMARY OF THE INVENTION

In accordance with the present invention, a safety apparatus for a vehicle occupant comprises an inflatable airbag and a source of gas, preferably gas generating material, for inflating the airbag to cause the airbag to move into the vehicle occupant compartment. A closure panel is interposed between the airbag and the occupant compartment. An ignitable material is supported by the closure panel in a position between the airbag and the occupant compartment. When ignited, the ignitable material acts on the closure panel to facilitate inflation of the airbag past the closure panel into the vehicle occupant compartment.

In accordance with one preferred embodiment of the invention, the ignitable material ruptures the closure panel to facilitate movement of the inflating airbag into the vehicle occupant compartment. The ignitable material is preferably a linear ignition material, and may be encased entirely within the closure panel. Alternately, the linear ignition material may be inserted within a groove in the surface of the closure panel, or may be supported on the surface of the closure panel. The linear ignition material may be arranged in a pattern to define sections of the closure panel which are separated upon ignition of the linear ignition material, and which can easily be pushed out of the path of movement of the inflating airbag.

In accordance with another preferred embodiment of the invention, the closure panel comprises a door having a closed position in which the door is interposed between the airbag and the occupant compartment, and an open position in which the door is not interposed between the airbag and the occupant compartment. The door includes an outer surface which faces the occupant compartment, and an edge surface. A door frame surface faces the door edge surface. A locking means between the door frame surface and the door edge surface holds the door in the closed position. The locking means between the door frame surface and the door edge surface preferably comprises a locking pin. The locking pin has one end received in a cavity in the door, and another end received in a cavity in the door frame. An explosive material, preferably a linear pyrotechnic transmission material supported by the door, when ignited drives the pin out of the door and into the door frame to release the door and to facilitate inflating movement of the airbag.

BRIEF DESCRIPTION OF THE DRAWINGS

These and other features of the present invention will become apparent to those skilled in the art upon reading the following description of preferred embodiments of the invention with reference to the accompanying drawings, in which:

FIG. 1 is a schematic view of a vehicle occupant safety apparatus in a vehicle occupant compartment;

FIG. 2 is a schematic sectional view of an occupant safety apparatus in accordance with the present invention;

FIG. 3 is a schematic view of a system including the occupant safety apparatus of FIG. 2;

FIG. 4 is a perspective view of a closure panel for use with the occupant safety apparatus of FIG. 2;

FIG. 5 is a sectional view taken on line 5—5 of FIG. 4;

FIG. 6 is an enlarged partial view of the closure panel of FIG. 5;

FIG. 7 is an enlarged partial view of an alternate embodiment of a closure panel in accordance with the invention;

FIG. 8 is an enlarged partial view of another alternate embodiment of a closure panel in accordance with the invention;

FIG. 9 is a schematic partial view of an alternate safety apparatus embodying the present invention;

FIG. 10 is a schematic view of parts of the safety apparatus of FIG. 9; and

FIG. 11 is a schematic view of a system including the safety apparatus of FIG. 9.

DESCRIPTION OF PREFERRED EMBODIMENTS

Figure 12:
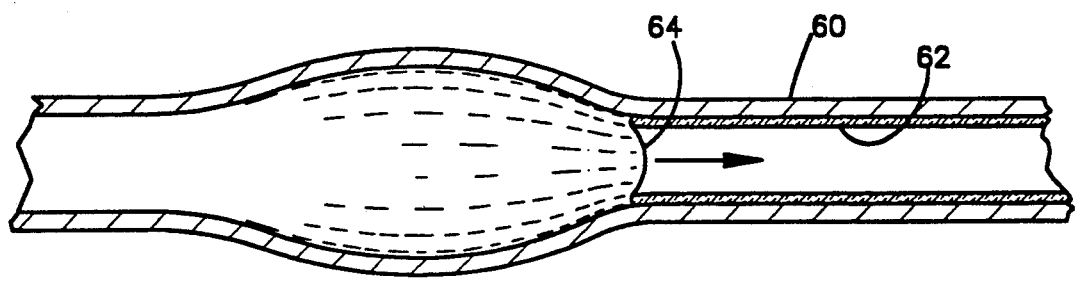
FIG. 12 is a sectional view of a part of a safety apparatus in accordance with the invention.

In FIG. 1, there is shown a vehicle occupant safety apparatus mounted in the dashboard 10 of a vehicle. The safety apparatus includes an inflatable airbag 12 having an inflated position located relative to the vehicle occupant's seat 14 to restrain forward movement of the vehicle occupant when the vehicle experiences a crash.

As shown schematically in FIG. 2, the airbag 12 is stored in a folded condition in a housing 16 which is mounted in the dashboard 10. The housing 16 has a rim surface 17 defining a deployment opening, and contains a gas source housing 18 having gas flow openings 20. Preferably, the gas source is an ignitable gas generating material 22 contained within the gas source housing 18. A closure panel 24 is interposed between the airbag 12 and the vehicle occupant compartment to conceal the airbag 12 and the housing 16 from the occupant compartment. The closure panel 24 is formed of a flexible plastic material similar to the material of which the dashboard 10 is made. The closure panel 24 fits into the dashboard 10 so as to appear as a continuation of the dashboard 10.

Also shown schematically in FIG. 2 are control devices, including a firing manifold 26 and a crash sensor 28. The firing manifold 26 is connected to the gas source housing 18 and the closure panel 24 by ignition signal lines 30. The crash sensor 28 is connected to the firing manifold 26 by electrical signal lines 32. The crash sensor 28 responds to a crash experienced by the vehicle, and sends an electrical signal indicating a crash to the firing manifold 26. The firing manifold 26 responds to the electrical signal received from the crash sensor 28, and sends ignition signals to the ignitable gas generating material 22 contained in the gas source housing 18 and to a length of linear ignition material 34 in the closure panel 24 (FIGS. 6–8).

The ignitable gas generating material 22 in the gas source housing 18 responds to the ignition signal received from the firing manifold 26 by generating gas rapidly. The gas is directed through the gas flow openings 20 to inflate the airbag 12, which moves outwardly from the deployment opening in the housing 16 and into the vehicle occupant compartment. The ignitable material 34 in the closure panel 24 responds to the ignition signal received from the firing manifold 26 by rupturing the closure panel 24 to facilitate outward inflating movement of the airbag 12.

The control devices and associated connections are illustrated more specifically in FIG. 3. A pair of blasting caps known as microdets 40 is housed within the firing manifold 26. The electrical signal lines 32 connecting the crash sensor 28 with the firing manifold 26 comprise pairs of electrical wires 42 extending between the crash sensor 28 and each one of the two microdets 40. Two microdets 40 are connected to the crash sensor 28 to provide redundancy so that one will serve as a backup if the other fails.

The ignition signal lines 30 connecting the firing manifold 26 to the gas source housing 18 and to the closure panel 24 comprise lengths of linear pyrotechnic transmission material. Two lengths 44 and 46 of linear pyrotechnic transmission material extend from the firing manifold 26 to the gas source housing 18 such that one of the lengths 44 or 46 will serve as a backup if the other of the lengths 44 or 46 fails. Another two lengths of linear pyrotechnic transmission material 48 and 50 similarly extend from the firing manifold toward the closure panel 24 as backups for one another. The linear ignition material 34 extends accross the closure panel 24 between two joints 52. The joints 52 connect the lengths of linear pyrotechnic transmission material 48 and 50 to the length of linear ignition material 34.

A preferred linear pyrotechnic transmission material is known by the trademark TLX, a trademark of Explosive Technology, Inc. of Fairfield, Calif. A length of TLX "thin layer explosive" comprises an elongate hollow tube having a coating of pyrotechnic material on the inner wall of the tube which, when ignited, propagates a hot gaseous percussion wave along the tube. The TLX thereby serves as a fuse for transmitting an ignition signal. The lengths of linear pyrotechnic transmission material 44, 46, 48 and 50 may be formed as TLX lines as disclosed in U.S. Pat. No. 3,590,739.

As shown in FIG. 12, the lengths of linear pyrotechnic transmission material 44, 46, 48 and 50 each comprise a hollow tube 60 having a coating of pyrotechnic material 62 on the inner wall of the tube 60 which, when ignited as shown, propagates a hot gaseous percussion wave 64 moving along the tube 60.

A preferred linear ignition material is known by the trademark ITLX, also a trademark of Explosive Technology, Inc. As disclosed in U.S. Pat. No. 4,220,087, a length of ITLX comprises a frangible sheath having a core of nondetonating ignitable material. The core comprises a mixture of particulate fuel having a high heat of combustion, an oxidant, and a binder. An elongate gas channel extends longitudinally within the sheath and supports ignition of the ignitable material. The ignitive reaction travels along the sheath at a supersonic rate and shatters the sheath to spew burning reaction products from the sheath in a radial direction.

Figure 13:
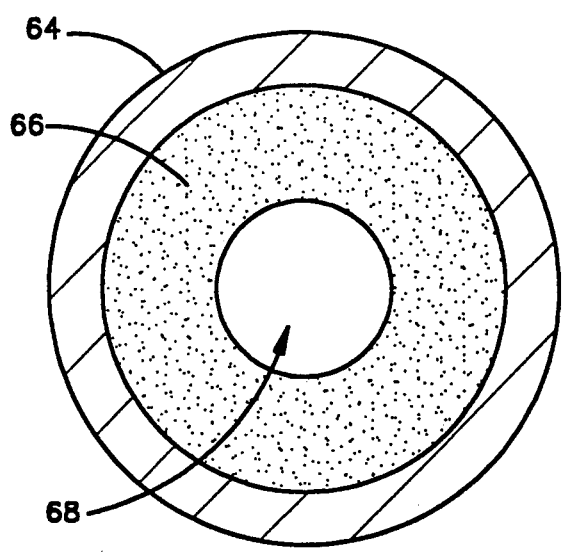
FIG. 13 is a sectional view of another part of a safety apparatus in accordance with the invention.

As shown in FIG. 13, the length of linear ignition material 34 comprises a frangible sheath 64 having a core of nondetonating ignitable material 66 which comprises a mixture of particulate fuel having a high heat of combustion, an oxidant, and a binder. An elongate gas channel 68 extends longitudinally within the sheath 64 and supports ignition of the ignitable material 66.

When the crash sensor 28 senses a crash experienced by the vehicle, electrical signals are sent along the wires 42 to the two microdets 40 to ignite the microdets 40. When ignited, the microdets 40 emit products of combustion which propagate within the firing manifold 26. Combustion in the firing manifold 26 ignites the lengths of linear pyrotechnic transmission material 44 and 46 extending from the firing manifold 26 to the gas source housing 18. The ignited lengths 44 and 46 of pyrotechnic transmission material each send an ignition signal in the form of a percussion wave to the gas source housing 18. The gas generating material 22 contained within the gas source housing 18 responds to the ignition signals received from the lengths 44 and 46 of pyrotechnic transmission material by igniting to generate gas for inflation of the airbag 12. The gas source housing 18 may contain a length of ITLX linear ignition material which ignites in response to the percussion wave transmitted along the linear pyrotechnic transmission lines 44 and 46 to ignite the gas generating material 22, as is known.

Combustion within the firing manifold 26 also serves to ignite the lengths 48 and 50 of linear pyrotechnic transmission material extending from the firing manifold 26 toward the closure panel 24. The ignited lengths 48 and 50 of pyrotechnic transmission material each send an ignition signal in the form of a percussion wave through the joints 52 to the length of linear ignition material 34 which extends across the closure panel 24. The linear ignition material 34 responds to the ignition signals by igniting to emit products of combustion radially against the closure panel 24 and thereby to rupture the closure panel 24. The closure panel 24 should be ruptured at a time not later than the time when the airbag 12 is inflated into a condition of readiness to emerge through the opening provided by the ruptured closure panel 24.

Three different embodiments of the closure panel 24 in combination with the linear ignition material 34 are shown in FIGS. 4-8. The closure panel 24 has a rectangular rear edge section 70 for attachment of the closure panel 24 to the housing 16 by conventional means. The closure panel 24 also includes a major portion 74 having a front surface 76 and a rear surface 78. Rounded grooves 80 extend along the length of the closure panel 24 at the upper and lower portions thereof as shown in FIG. 5.

In the preferred embodiment of the invention, the closure panel 24 includes an internal passage 82 extending within the closure panel 24 in an H-shaped configuration as indicated by the broken lines in FIG. 4. As shown in FIGS. 5 and 6, the linear ignition material 34 extends in one or more pieces throughout the internal passage 82 in the closure panel 24, and has end portions 84 extending outwardly from the rear surface 78 of the major portion 74 of the closure panel 24. The end portions 84 of the linear ignition material 34 extend to the joints 52 for connection to the lengths 48 and 50 of linear pyrotechnic transmission material.

Upon receipt of an ignition signal from the firing manifold 26, the linear ignition material 34 in the internal passage 82 of the closure panel 24 will ignite t sever the closure panel 24 into separate panel sections defined by the H-shaped configuration of the internal passage 82. The inflating airbag 12 can then move outwardly through an opening defined between the severed panel sections by pushing the severed panel sections to rotate outwardly about the rounded grooves 80. Rotation of the severed panel sections out of the path of movement of the inflating airbag 12 will require only a negligible amount of the gas pressure in the airbag 12.

An alternate embodiment of the closure panel 24 in combination with the linear ignition material 34 is shown in FIG. 7. In the FIG. 7 embodiment, the linear ignition material 34 extends within a groove 86 formed in the rear surface 78 of the closure panel 24. A molded plastic material 88 supports the linear ignition material 34 in the groove 86, and is finished flush with the rear surface 78 of the closure panel 24. The molded plastic material 88 can be applied by means of a room temperature vulcanization (RTV) process. A sheet of heat shielding material 90, such as aluminum foil, may be placed between the rear surface 78 of the closure panel 24 and the airbag 12 to shield the airbag from combustion of the linear ignition material 34. In another alternate embodiment, as shown in FIG. 8, the linear ignition material 34 extends along the rear surface 78 of the closure panel 24 between the rear surface 78 and the heat shield 90.

Another alternate embodiment of the invention is shown in FIGS. 9-11. As shown in FIG. 9, an alternate closure panel 100 comprises a door 102 and a hinge 104. The hinge 104 is connected to the dashboard 10 of the vehicle for pivotal movement of the door in the direction indicated by the arrows shown in FIG. 9. The door 102 has a front surface 106 facing the passenger compartment of the vehicle, and opposite edge surfaces 108 which are perpendicular to the front surface 106. The door 106 also includes cylindrical inner surfaces 110 defining cylindrical cavities extending inwardly from the edge surfaces 108. As shown partially in FIG. 10, a door frame structure 114 surrounds the door 102, and includes frame surfaces 116 adjoining the edge surfaces 108 of the door 102. The door frame structure 114 also includes cylindrical inner surfaces 118 which define cavities in positions coaxially aligned with the cavities in the door 102. A cylindrical locking pin 130 extends partially into a cavity in the door frame structure 114 and partially into a cavity at an adjoining door edge surface 108. The locking pins 130 hold the door edge surfaces 108 in their positions adjoining the door frame surfaces 116, and thereby hold the door 102 in a closed position extending over the deployment opening 17 of the housing 16.

As shown in FIG. 11, the closure panel 100 comprising the door 102 is connected to the firing manifold 26 by two lengths 132 and 134 of linear pyrotechnic transmission material 132. Each length 132 and 134 of linear pyrotechnic transmission material extends into the door 102 to a position in coaxial engagement with the end of a cylindrical locking pin 130. In the preferred embodiment, the lengths 132 and 134 of pyrotechnic transmission material are TLX lines as shown in FIG. 12, with the end of a TLX tube received tightly over an end of a cylindrical locking pin 130 as shown in FIGS. 9 and 11. Each length 132 and 134 of linear pyrotechnic transmission material carries an ignition signal from the firing manifold 26 to a locking pin 130 in the form of a percussion wave as indicated in FIG. 10. The percussion waves force the locking pins 130 out of the cavities in the door 102 and farther into the cavities in the door frame structure 114 as indicated in FIG. 10 to release the door 102 for movement from its closed position. The door 102 can then be easily rotated about the hinge 104 to be moved out of the closed position by the outwardly inflating airbag 12.

From the above description of preferred embodiments of the invention, those skilled in the art will perceive improvements, changes and modifications. For example, although the housing 16 is illustrated as a separate structural member mounted in the dashboard 10, a housing could be defined by the dashboard and/or the structural supports for the dashboard. Similarly, if the airbag 12 were installed in a steering wheel or column, a housing could be defined by the structure of the wheel or column. Such improvements, changes and modifications are intended to be covered by the appended claims.

Having described the invention, the following is claimed:

1. A safety apparatus for a vehicle occupant, said safety apparatus comprising:

a housing having a deployment opening;

an inflatable airbag in said housing;

a source of gas for inflating said airbag to cause said airbag to move outwardly from said deployment opening;

a door having a closed position in which said door closes said deployment opening and an open position, said door having an edge surface and a first inner surface defining a first cavity which opens into said edge surface;

a door frame having a frame surface facing said edge surface of said door and a second inner surface defining a second cavity which opens into said frame surface;

a locking pin having a locked position extending partially into said first cavity and partially into said second cavity to lock said door in said closed position; and explosive means for driving said locking pin out of said locked position to release said door for movement from said closed position to said open position.

2. A safety apparatus as defined in claim 1 wherein said first and second inner surfaces are cylindrical surfaces, and said locking pin is a cylindrical member closely receivable within said first and second cavities.

3. A safety apparatus as defined in claim 2 wherein said explosive means comprises a length of pyrotechnic transmission material extending within said door and having an end portion in a position to direct a explosive force into said first cavity, said end portion of said length of pyrotechnic transmission material being coaxially aligned with said locking pin.

4. A safety apparatus as defined in claim 3 wherein said length of pyrotechnic transmission material comprises a plastic tube, and said locking pin is receivable tightly in said plastic tube to be held in said locked position.

5. A safety apparatus as defined in claim 1 wherein said explosive means drives said locking pin out of said first cavity into said second cavity to release said door for movement from said closed position to said open position by said airbag when said airbag moves outwardly from said deployment opening.

6. A safety apparatus for a vehicle occupant compartment comprising:
  a housing having a deployment opening;
  an inflatable airbag in said housing;
  a source of gas for inflating said airbag to cause said airbag to move outwardly from said deployment opening into the vehicle occupant compartment;
  a door in a closed position extending across said deployment opening between said airbag and the vehicle occupant compartment, said door having an outer surface facing the vehicle occupant compartment and having an edge surface;
  means for supporting said door for pivotal movement relative to said housing from said closed position to an open position;
  a door frame having a frame surface facing said edge surface of said door;
  a movable locking member in a locking position extending from said frame surface to said edge surface, said locking member holding said door in said closed position; and
  unlocking means for permitting said airbag to move said door from said closed position to said open position when inflating, said unlocking means comprising an explosive material arranged to direct an explosive force against said locking member to move said locking member out of said locking position in a direction across said deployment opening.

7. A safety apparatus as defined in claim 6 wherein said unlocking means includes a length of linear pyrotechnic transmission material comprising an elongate hollow tube having an inner wall and a coating of pyrotechnic material on said inner wall which, when ignited, propagates a gaseous percussion wave moving along the length of said tube, said length of linear pyrotechnic transmission material being arranged to direct said gaseous percussion wave against said locking member in said direction across said deployment opening.

8. A safety apparatus as defined in claim 7 wherein said locking member is a pin supported for movement along the longitudinal axis of said pin.

* * * * *